(12) United States Patent
Martha

(10) Patent No.: US 10,192,000 B2
(45) Date of Patent: Jan. 29, 2019

(54) SYSTEM AND METHOD FOR DISTRIBUTED SYSTEM TO STORE AND VISUALIZE LARGE GRAPH DATABASES

(71) Applicant: WAL-MART STORES, INC., Bentonville, AR (US)

(72) Inventor: Venkata Swamy Martha, Santa Clara, CA (US)

(73) Assignee: WALMART APOLLO, LLC, Bentonville, AR (US)

(*) Notice: Subject to any disclaimer, the term of this patent is extended or adjusted under 35 U.S.C. 154(b) by 318 days.

(21) Appl. No.: 15/010,841

(22) Filed: Jan. 29, 2016

(65) Prior Publication Data
US 2017/0220703 A1 Aug. 3, 2017

(51) Int. Cl.
*G06F 17/30* (2006.01)
*G06T 11/20* (2006.01)
*G06F 3/0484* (2013.01)
*G06F 3/0485* (2013.01)
*G06F 17/24* (2006.01)

(52) U.S. Cl.
CPC ...... *G06F 17/30994* (2013.01); *G06F 3/0485* (2013.01); *G06F 3/04845* (2013.01); *G06F 17/24* (2013.01); *G06F 17/30545* (2013.01); *G06F 17/30575* (2013.01); *G06F 17/30958* (2013.01); *G06F 17/30976* (2013.01);
(Continued)

(58) Field of Classification Search
CPC ............... G06F 17/24; G06F 17/30545; G06F 17/30958; G06F 17/30976; G06F 17/30979; G06F 17/30994; G06F 3/04845; G06F 3/0485; G06F 11/206; G06F 2203/04806; G06F 17/30991; G06F 17/30867
See application file for complete search history.

(56) References Cited

U.S. PATENT DOCUMENTS

2004/0249809 A1* 12/2004 Ramani ............ G06F 17/30259
707/E17.014
2012/0150859 A1* 6/2012 Hu ........................ G06Q 10/00
707/737
(Continued)

OTHER PUBLICATIONS

K. Nixon, "Sustainable Competitive Advantage: Creating Business Value through Data Relationships", Neo4j.com, Feb. 2015, 12 pages.

*Primary Examiner* — Anh Ly
(74) *Attorney, Agent, or Firm* — Bryan Cave Leighton Paisner LLP

(57) ABSTRACT

A system and method for implementing distributed storage and visualization for a graph database system for very large graph databases is presented. A graph database can comprise nodes and edges stored as artifacts, which can then be indexed using a distributed index system. A system capable of performing such tasks can include a processing system that creates an index of the artifacts, a construction system that can create a graph database from a text file, and a reading system that can create a text file from a graph database by finding requested artifacts in the graph of interest. A visualization system can perform queries on a graph database, then create sub-graphs containing the results for visualization purposes. The sub-graph can receive navigation inputs that display various portions of the sub-graph. Other embodiments also are disclosed.

23 Claims, 7 Drawing Sheets

(52) U.S. Cl.
CPC ...... *G06F 17/30979* (2013.01); *G06T 11/206* (2013.01); *G06F 2203/04806* (2013.01)

(56) References Cited

U.S. PATENT DOCUMENTS

| | | | |
|---|---|---|---|
| 2013/0275429 A1* | 10/2013 | York | G06F 17/30029 707/737 |
| 2015/0244734 A1* | 8/2015 | Olson | G06F 21/577 726/25 |
| 2015/0363294 A1* | 12/2015 | Carback, III | G06F 8/37 717/132 |
| 2017/0024450 A1* | 1/2017 | Narayanan | G06F 17/30581 707/E17.044 |
| 2017/0124221 A1* | 5/2017 | Song | G06F 17/30979 707/E17.103 |

\* cited by examiner

SYSTEM AND METHOD FOR DISTRIBUTED SYSTEM TO STORE AND VISUALIZE LARGE GRAPH DATABASES

TECHNICAL FIELD

This disclosure relates generally to database systems, and relates more particularly to a graph database system.

BACKGROUND

A database is an organized collection of data, commonly stored and accessed on a computer. Database systems are computer software applications that allow users and other applications to interact with a database to capture and analyze data. A graph database is a type of database that utilizes a graph structure for data instead of the more traditional table structure. As graph databases become larger and more complex, it becomes more desirable for a graph database system to utilize distributed systems for storing and accessing the graph database in a more efficient manner.

BRIEF DESCRIPTION OF THE DRAWINGS

To facilitate further description of the embodiments, the following drawings are provided in which.

Figure 1:
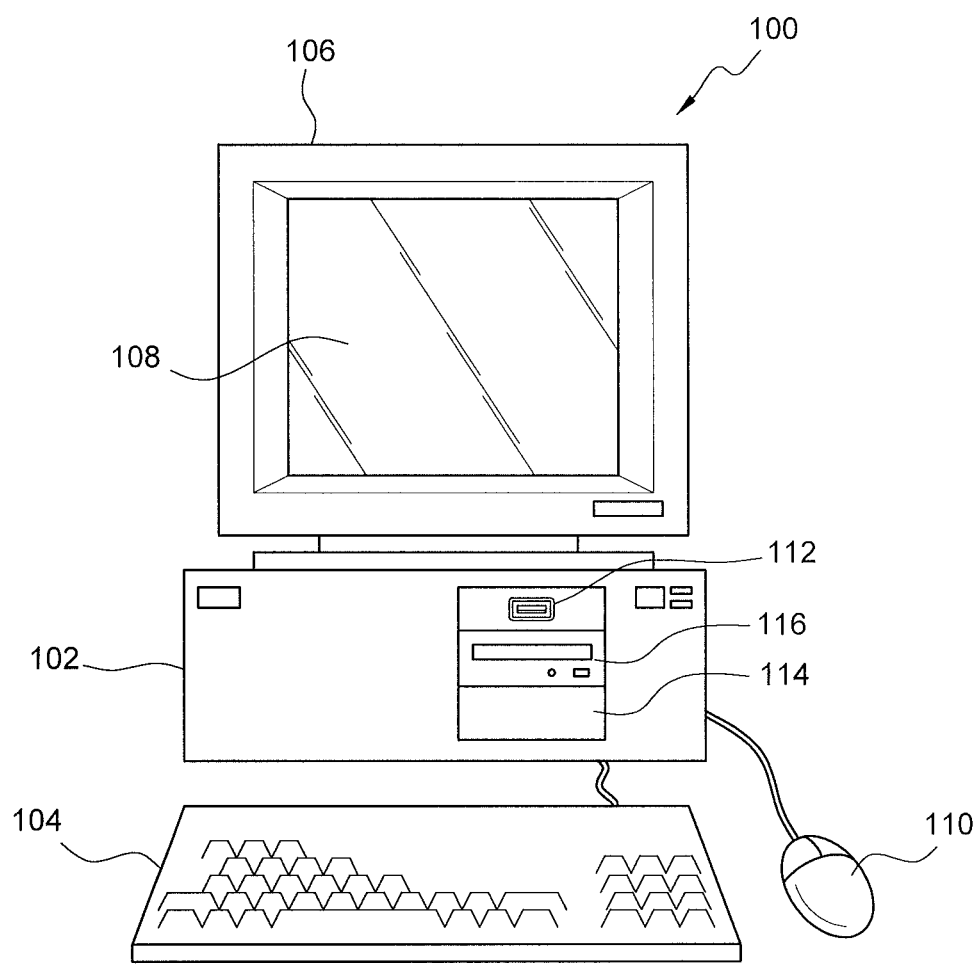
FIG. 1 illustrates a front elevation view of a computer system that is suitable for implementing at least part of a central computer system.

For simplicity and clarity of illustration, the drawing figures illustrate the general manner of construction, and descriptions and details of well-known features and techniques might be omitted to avoid unnecessarily obscuring the present disclosure. Additionally, elements in the drawing figures are not necessarily drawn to scale. For example, the dimensions of some of the elements in the figures might be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but might include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements can be electrically coupled together, but not be mechanically or otherwise coupled together. Coupling can be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Some embodiments include a system. The system can include: a construction module arranged to receive a text input and generate a first graph database; a processing module arranged to create an index from the first graph database, wherein the first graph database is stored on a first distributed storage system; and an index storage module arranged to store the index on a second distributed storage system.

Some embodiments include a system. The system can include: one or more processing modules; and one or more non-transitory memory storage modules storing computing instructions configured to run on the one or more processing modules and perform the acts of: receiving a request; searching a distributed graph database with a distributed index to generate a result; generating a first sub graph from the result; creating a visual representation of the first sub-graph; and causing the display of the visual representation of the first sub-graph.

Some embodiments include a method. The method can include: receiving a request; searching a distributed graph database with a distributed index to generate a result; generating a first sub-graph from the result; creating a visual representation of the first sub-graph; and causing the display of the visual representation of the first sub-graph.

Figure 2:
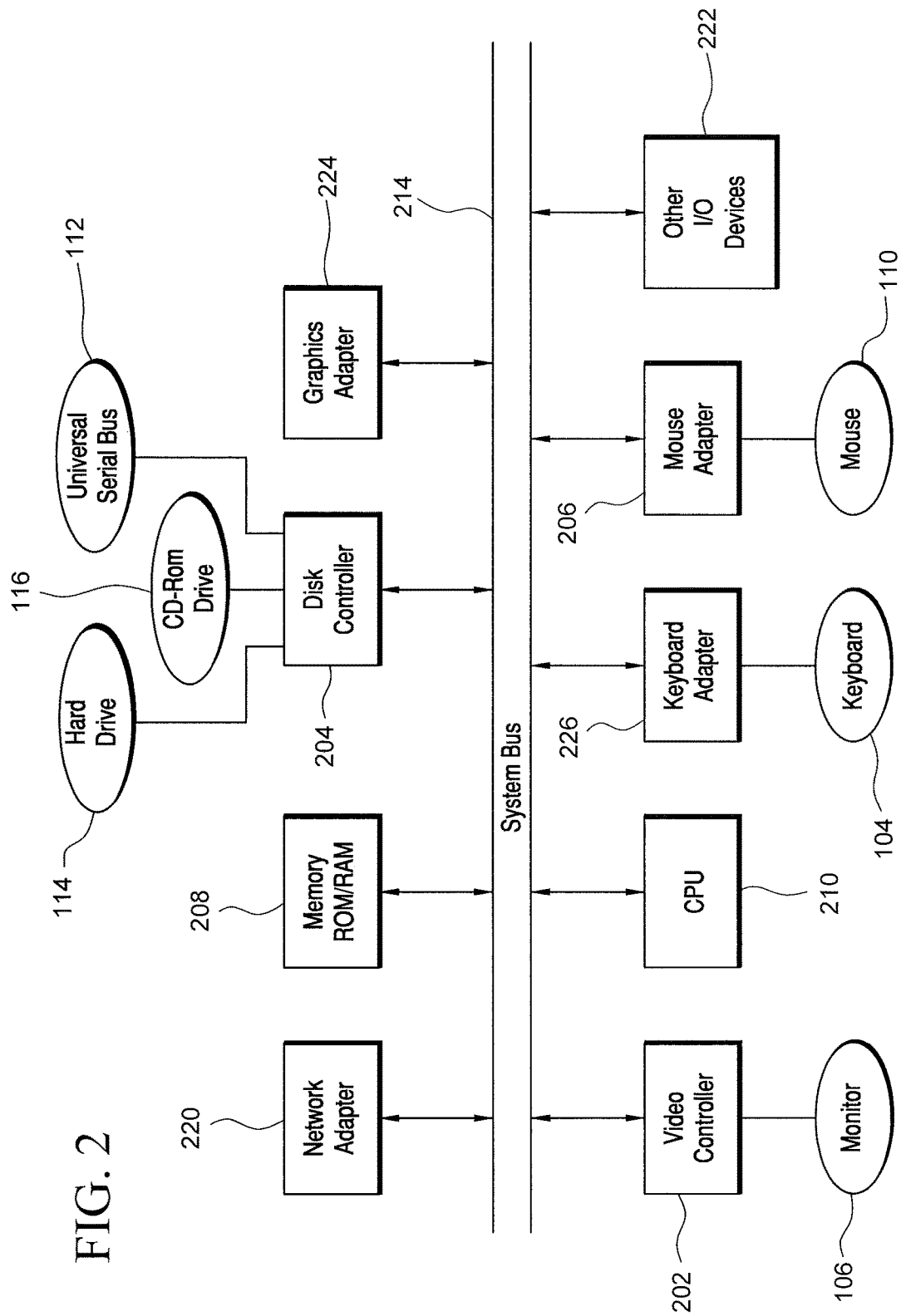
FIG. 2 illustrates a representative block diagram of exemplary elements included on the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a drive 114. Drive 114 can be a hard drive that uses spinning magnetic disks to store data or it can be a solid state drive (SSD) that uses a fast, non-volatile memory for storage. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), drive 114 (FIGS. 1-2), CD-ROM and/or DVD drive 116 (FIGS. 1-2), a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
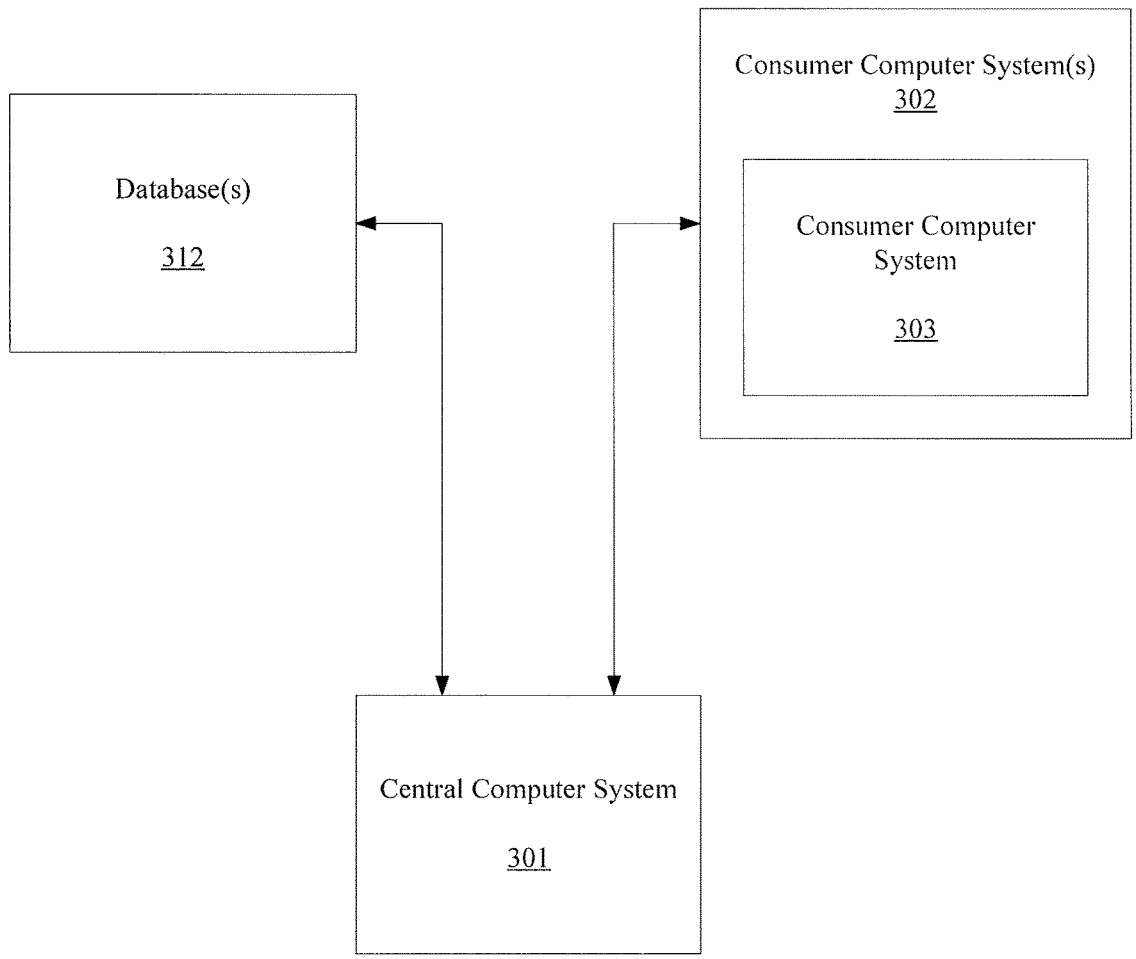
FIG. 3 illustrates a representative block diagram of a system, according to an embodiment.

Skipping ahead now in the drawings, FIG. 3 illustrates a representative block diagram of a system 300, according to an embodiment. System 300 is merely exemplary and embodiments of the system are not limited to the embodiments presented herein. System 300 can be employed in many different embodiments or examples not specifically depicted or described herein. In some embodiments, certain elements or modules of system 300 can perform various methods and/or activities of those methods. In these or other embodiments, the methods and/or the activities of the methods can be performed by other suitable elements or modules of system 300.

As further described in greater detail below, in these or other embodiments, system 300 can proactively (e.g., prospectively) and/or reactively (e.g., responsively) determine and/or communicate the consumer product information to the consumer, as desired. Proactive acts can refer to acts (e.g., identification, determination, communication, etc.) performed without consideration of one or more predetermined acts performed by the consumer, and reactive acts can refer to acts (e.g., identification, determination, communication, etc.) performed with consideration of (i.e., in response to) one or more predetermined acts performed by the consumer. For example, in some embodiments, the predetermined act(s) can comprise an act of identifying a selection of a consumer product by the consumer.

Meanwhile, as also described in greater detail below, system 300 can be implemented in brick-and-mortar commerce and/or electronic commerce applications, as desirable. Further, in many of these or other embodiments, system 300 can communicate the consumer product information to the consumer substantially in real-time (e.g., near real-time). Near real-time can mean real-time less a time delay for processing (e.g., determining) and/or transmitting the relevant consumer product information to the relevant consumer. The particular time delay can vary depending on the type and/or amount of the consumer product information, the processing speed(s) of the processing module(s) of system 300, the transmission capability of the communication hardware (as introduced below), the transmission distance, etc. However, in many embodiments, the time delay can be less than approximately one, five, ten, or twenty minutes.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Specifically, system 300 comprises a central computer system 301. In many embodiments, central computer system 301 can be similar or identical to computer system 100 (FIG. 1). Accordingly, central computer system 301 can comprise one or more processing modules and one or more memory storage modules (e.g., one or more non-transitory memory storage modules). In these or other embodiments, the processing module(s) and/or the memory storage module(s) can be similar or identical to the processing module(s) and/or memory storage module(s) (e.g., non-transitory memory storage modules) described above with respect to computer system 100 (FIG. 1). In some embodiments, central computer system 301 can comprise a single computer or server, but in many embodiments, central computer system 301 comprises a cluster or collection of computers or servers and/or a cloud of computers or servers. Meanwhile, central computer system 301 can comprise one or more input devices (e.g., one or more keyboards, one or more keypads, one or more pointing devices such as a computer mouse or computer mice, one or more touchscreen displays, etc.), and/or can comprise one or more display devices (e.g., one or more monitors, one or more touchscreen displays, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of central computer system 301 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of central computer system 301. In a similar manner, the processing module(s) and the memory storage module(s) can be local and/or remote to each other.

In many embodiments, central computer system 301 is configured to communicate with one or more consumer computer systems 302 (e.g., a consumer computer system 303) of one or more consumers. For example, the consumer(s) can interface (e.g., interact) with central computer system 301, and vice versa, via consumer computer system(s) 302 (e.g., consumer computer system 303). Accordingly, in many embodiments, central computer system 301 can refer to a back end of system 300 operated by an operator and/or administrator of system 300, and consumer computer system(s) 302 can refer to a front end of system 300 used by one or more users of system 300 (i.e., the consumer(s)). In these or other embodiments, the operator and/or administrator of system 300 can manage central computer system 301, the processing module(s) of computer system 301, and/or the memory storage module(s) of computer system 301 using the input device(s) and/or display device(s) of central computer system 301. In some embodiments, system 300 can comprise consumer computer system(s) 302 (e.g., consumer computer system 303).

Like central computer system 301, consumer computer system(s) 302 each can be similar or identical to computer system 100 (FIG. 1), and in many embodiments, each of consumer computer system(s) 302 can be similar or identical to each other. In many embodiments, consumer computer system(s) 302 can comprise one or more desktop computer devices, one or more wearable user computer devices, and/or one or more mobile devices, etc. At least part of central computer system 301 can be located remotely from consumer computer system(s) 302.

In some embodiments, a mobile device can refer to a portable electronic device (e.g., an electronic device easily conveyable by hand by a person of average size) with the capability to present audio and/or visual data (e.g., images, videos, music, etc.). For example, a mobile device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can comprise a volume and/or weight sufficiently small as to permit the mobile device to be easily conveyable by hand. For examples, in some embodiments, a mobile device can occupy a volume of less than or equal to approximately 189 cubic centimeters, 244 cubic centimeters, 1790 cubic centimeters, 2434 cubic centimeters, 2876 cubic centimeters, 4056 cubic centimeters, and/or 5752 cubic centimeters. Further, in these embodiments, a mobile device can weigh less than or equal to 3.24 Newtons, 4.35 Newtons, 15.6 Newtons, 17.8 Newtons, 22.3 Newtons, 31.2 Newtons, and/or 44.5 Newtons.

Exemplary mobile devices can comprise, but are not limited to, one of the following: (i) an iPod®, iPhone®, iPod Touch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia®, Surface Pro™, or similar product by the Microsoft Corporation of Redmond, Wash., United States of America, and/or (iv) a Galaxy™, Galaxy Tab™, Note™, or similar product by the Samsung Group of Samsung Town, Seoul, South Korea. Further, in the same or different embodiments, a mobile device can comprise an electronic device configured to implement one or more of (i) the iOS™ operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by Google, Inc. of Mountain View, Calif., United States, (v) the Windows Mobile™, Windows Phone™ and Windows 10 (mobile)™ operating systems by Microsoft Corporation of Redmond, Wash., United States of America, or (vi) the Symbian™ operating system by Nokia Corp. of Keilaniemi, Espoo, Finland.

In further embodiments, central computer system 301 can be configured to communicate with software (e.g., one or more web browsers, one or more mobile software applications, etc.) of the consumer computer system(s) 302 (e.g., consumer computer system 303). For example, the software can run on one or more processing modules and can be stored on one or more memory storage modules (e.g., one or more non-transitory memory storage modules) of the consumer computer system(s) 302 (e.g., consumer computer system 303). In these or other embodiments, the processing module(s) of the consumer computer system(s) 302 (e.g., consumer computer system 303) can be similar or identical to the processing module(s) described above with respect to computer system 100 (FIG. 1). Further, the memory storage module(s) (e.g., non-transitory memory storage modules) of the consumer computer system(s) 302 (e.g., consumer computer system 303) can be similar or identical to the memory storage module(s) (e.g., non-transitory memory storage module(s)) described above with respect to computer system 100 (FIG. 1). Exemplary web browsers can include (i) Firefox® by the Mozilla Organization of Mountain View, Calif., United States of America, (ii) Internet Explorer® by the Microsoft Corp. of Redmond, Wash., United States of America, (iii) Chrome™ by Google Inc. of Menlo Park, Calif., United States of America, (iv) Opera® by Opera Software of Oslo, Norway, and (v) Safari® by Apple Inc. of Cupertino, Calif., United States of America.

Meanwhile, in many embodiments, central computer system 301 also can be configured to communicate with one or more databases 312. The database can comprise a product database that contains information about products sold by a retailer. Database(s) 312 can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of database(s) 312, that particular database can be stored on a single memory storage module of the memory storage module(s) and/or the non-transitory memory storage module(s) storing database(s) 312, or it can be spread across multiple ones of the memory storage module(s) and/or non-transitory memory storage module(s) storing database(s) 312, depending on the size of the particular database and/or the storage capacity of the memory storage module(s) and/or non-transitory memory storage module(s).

In these or other embodiments, the memory storage module(s) of central computer system 300 can comprise some or all of the memory storage module(s) storing database(s) 312. In further embodiments, some of the memory storage module(s) storing database(s) 312 can be part of consumer computer systems 302 and/or one or more third-party computer systems (i.e., other than central computer system 301 and consumer computer systems 302), and in still further embodiments, all of the memory storage module(s) storing database(s) 312 can be part of consumer computer systems 302 and/or the third-party computer system(s). Like central computer system 301 and consumer computer system(s) 302, when applicable, each of the third-party computer system(s) can be similar or identical to computer system 100 (FIG. 1). Notably, the third-party computer systems are omitted from the drawings to better illustrate that database(s) 312 can be stored at memory storage module(s) of central computer system 301, consumer computer system(s) 302, and/or the third-party computer systems, depending on the manner in which system 300 is implemented.

Database(s) 312 each can comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between central computer system 301, consumer computer system(s) 302 (e.g., consumer computer system 303), and/or database(s) 312 can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise Data Over Cable Service Interface Specification (DOCS1S), Institute of Electrical and Electronic Engineers (IEEE) 802.3 (also known as Ethernet), IEEE 802.11 (also known as WiFi), etc. Exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, and the like. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.)

For convenience, the functionality of system 300 is described herein as it relates particularly to consumer computer system 303 and a single consumer. But in many embodiments, the functionality of system 300 can be extended to each of consumer computer system(s) 302 and/or to multiple consumers. In these extended examples, in some embodiments, single consumers can interface (e.g., interact) with central computer system 301 with multiple consumer computer systems of consumer computer system(s) 302 (e.g., at different times). For example, a consumer could interface with central computer system 301 via a first consumer computer system (e.g., a desktop computer), such as, for example, when interfacing with central computer system 301 from home, and via a second consumer computer system (e.g., a mobile device), such as, for example, when interfacing with central computer system 301 away from home.

A traditional relational database organizes data into tables, with each table comprising numerous fields (or columns) into which information can be placed and numerous rows which contain the data being stored. For example, a customer table might contain fields such as name, address, and demographic information for each user. A database with a customer table might contain a second product table that contains a list of items available for sale. The database is considered "relational" because one can perform actions on a database that retrieves data from multiple tables. For example, instead of having to store information about each product purchased by a customer, the customer table might only store an identifier of a product purchased by the customer. Information about the purchased product would be retrieved from the separate product table.

While the structured nature of a relational databases has advantages in certain situations, it has been found that relational databases suffer from various defects that make them unsuitable to other types of data storage. For example, the fields of a table must be predefined, such that only certain types of data can be stored in each field. In addition, joining data from separate tables can be time-consuming, memory-intensive, and computationally-complex.

A graph database alleviates many of these problems and has been found to be particularly useful in generating recommendations, such as product recommendations, and in tracking relationships among people or items. Exemplary use cases include item recommendations in an electronic commerce ("eCommerce") setting (generated because people buying one item might be interested in another item) and finding a "friend of a friend" relationship among people.

A graph database comprises nodes and relationships. Nodes are pieces of data being stored. A relationship (also known as an edge) joins two different nodes. The relationship contains the manner in which the two nodes are related. Returning to the customer database described above, each node in a graph database would represent a customer. There would be a connection indicating a relationship between each node. Thus, there would be a separate node for each product being sold. There also would be a relationship or connection between each customer node and each product node that the customer has purchased or otherwise interacted with. The relationships between product and customer are readily available, with no need for complex and time-intensive database join commands. The nodes are flexible so, as new data needs to be input, there is no needs to modify the structure of a table (for example, years ago, there might have been no field for an email address or cell phone number because such data was not common), instead one would just create a new node and note the relationship between the node and the other data (e.g., the email address belongs to a certain user).

While there are presently existing graph database systems, such as Titan, InfinitiGraph, Trinity, Neo4j, and HypergraphDB, they suffer from a variety of different issues. For example, many existing graph database systems, do not support distributed processing. This deficiency can result in a limitation of the performance of a graph database using those systems. Many existing systems do not support distributed indexing of a database, custom sharding of a database, and distributed storage of a database. These limitations can result in reduced performance and reduced ability to process very large databases. Thus, many current implementations resort to sampling data instead of performing queries and analysis of all the available data.

As stated above, one typical usage scenario of graph database is in an eCommerce setting. Very large retailers, such as Walmart or Sam's Club, might have tens of thousands, hundreds of thousands, or even millions of users in a given day. Each user is generating multiple pieces of data with each eCommerce visit in that each page they visit, each search they enter, and each item they purchase can be tracked to provide a better experience for both the user (who is able to receive recommendations for products that they might be interested in) and for the retailer (who is able to more accurately forecast demand based on the behavior of the customers). The result can be over a billion nodes being generated on the busiest shopping days (for example, Black Friday or Cyber Monday). Because each node might have multiple relationships, there can be over 2 billion relationships being generated for those days.

Even with the speed of today's processors and the storage capabilities of today's hard drives and other storage systems, the most efficient way to deal with such large data storage needs is through distributed storage.

Figure 4:
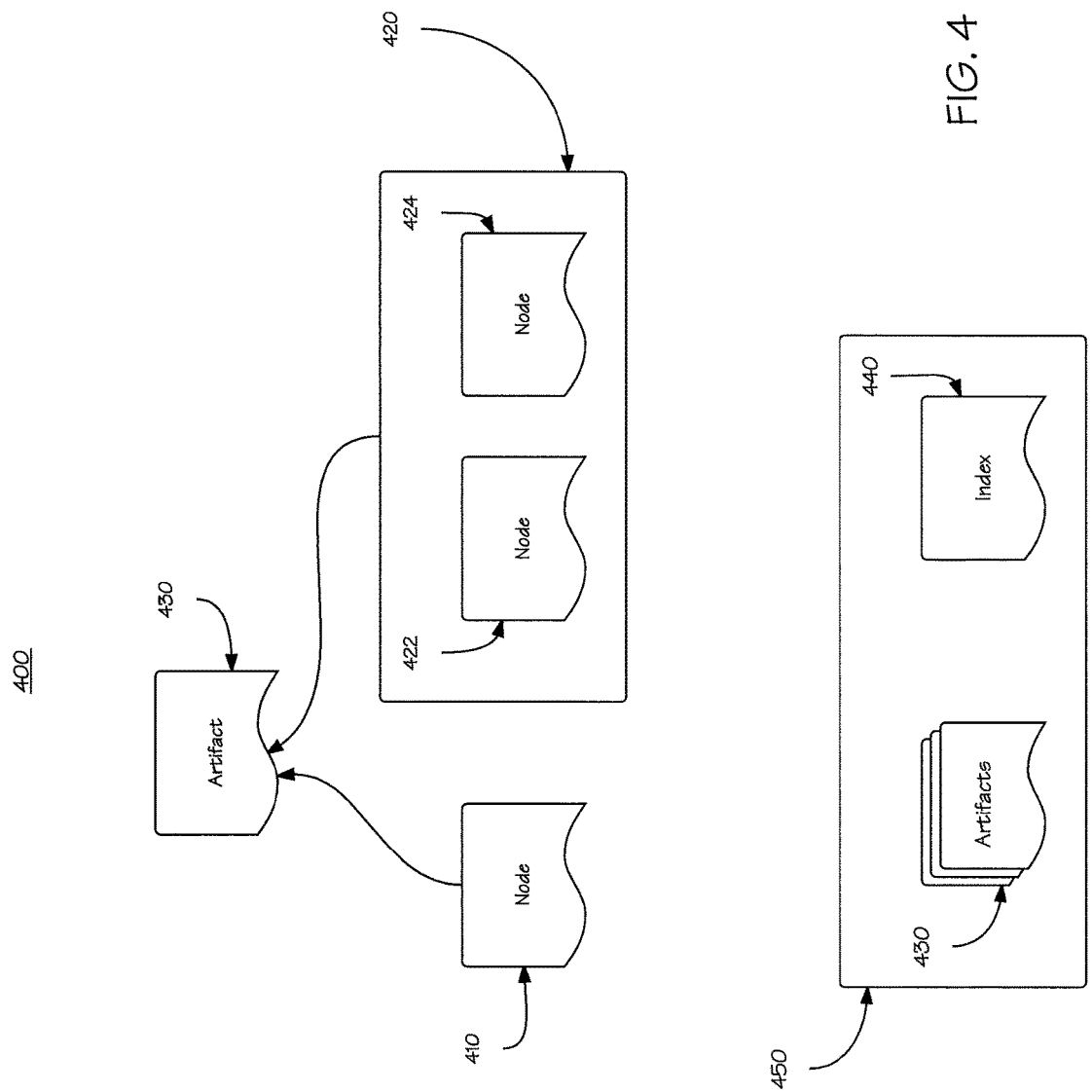
FIG. 4 is a block diagram illustrating a graph database used in an embodiment.

Turning ahead in the figures, FIG. 4 illustrates a block diagram of a graph database 400 that is used in disclosed embodiments. Graph database 400 is merely exemplary and is not limited to the embodiments presented herein. Graph database 400 can be employed in many different embodiments or examples not specifically depicted or described herein. In some embodiments, certain elements or modules of graph database 400 can perform various procedures, processes, and/or acts. In other embodiments, the procedures, processes, and/or acts can be performed by other suitable elements or modules.

Graph database 400 illustrates an exemplary implementation of a graph database of an embodiment. As in a traditional graph database, information is stored in nodes 410. Two or more nodes (such as nodes 422 and 424) can be joined together by an edge (or relationship) 420. A collection of nodes and edges can be stored together as an artifact 430. Multiple artifacts 430 can be indexed (shown as index 440) and can be a part of graph 450. Each artifact 430 is a document, and an index is built for each artifact. The index can be built in a variety of different manners. In some embodiments, a software program such as Lucene or Hadoop can be used to create the index.

Graph database 400 can be configured to be operable by a MapReduce algorithm. A MapReduce algorithm comprises a Map procedure that performs filtering and sorting on data, and also comprise a Reduce procedure that performs a summary operation on the mapped data. MapReduce algorithms can be used to perform various database actions on system 400. A MapReduce algorithm also can be used to create an index, such as index 440.

Figure 7:
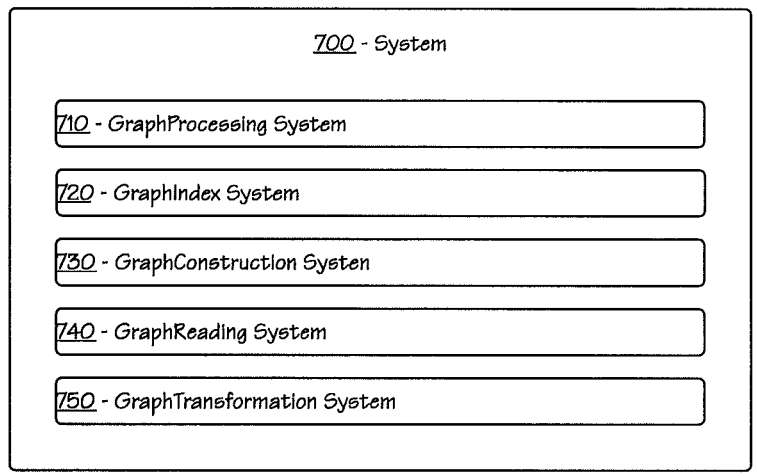
FIG. 7 is a block diagram illustrating a system capable of performing an embodiment.

Turning ahead in the figures, FIG. 7 illustrates a block diagram of a system 700 that is capable of performing disclosed embodiments. System 700 is merely exemplary and is not limited to the embodiments presented herein. System 700 can be employed in many different embodiments or examples not specifically depicted or described herein. In some embodiments, certain elements or modules of system 700 can perform various procedures, processes, and/or acts. In other embodiments, the procedures, processes, and/or acts can be performed by other suitable elements or modules.

System 700 can comprise a system called a GraphAtlas system. A GraphAtlas system comprises several components.

The GraphProcessing system 710 takes a given graph and builds an index of the graph elements (nodes and edges). GraphProcessing system 710 can leverage Hadoop's MapReduce platform to build the index and can scale for large amounts of data with the distributed resources in Hadoop.

Another element of the GraphAtlas system is a GraphIndex system 720. The GraphIndex system 720 is capable of storing the index created in GraphProcessing system 710.

Another element of the GraphAtlas system is a GraphConstruction system 730. GraphConstruction system 730 is capable of receiving a text file as an input and producing a graph database as an output. GraphConstruction system 730 can be useful in transforming a relational database into a graph database. The generated graph database can then be processed by GraphProcessing system 710 to build an index that can be stored by GraphIndex system 720.

Another element of the GraphAtlas system is a GraphReading system 740. The GraphReading system is capable of receiving a graph database (such as one created using GraphProcessing system 710) as an input and producing a text file as an output by finding requested artifacts in the graph of interest.

Another element of the GraphAtlas system is a GraphTransformation system 750. The GraphTransformation system is capable of receiving a graph database as an input and producing another graph database as an output. The generated graph database can be processed using GraphProcessing system 710 to build an index that can be stored by GraphIndex system 720.

Another aspect of an embodiment is a manner of visualizing a graph database. A viewer of a graph database might be called GraphExplorer. GraphExplorer allows a user to visualize a graphical overview of the relationships between nodes and edges. Viewers of the past often relied on loading an entire graph database into memory for display purposes. A side-effect of such a process is that the size of the graph database being viewed is limited by system memory (such as RAM). An embodiment of GraphExplorer might be configured to load only a portion of the graph database into memory. Thereafter, as a user browses the graph database, more areas of the graph database can be loaded into memory.

The GraphExplorer might comprise two components: 1) Searcher: a tool to query the distributed system to retrieve the requested graph elements; and 2) Visualizer: a tool to graphically display graphs in a user interface. The visualizer requests a sub-set of the entire graph into memory to be visualized. Thus, the entire graph need not be loaded into memory to create the visualization. The visualizer thus supports a thin client with a small amount of memory. The Visualizer and the Searcher work together to provide visualization services.

Figure 5:
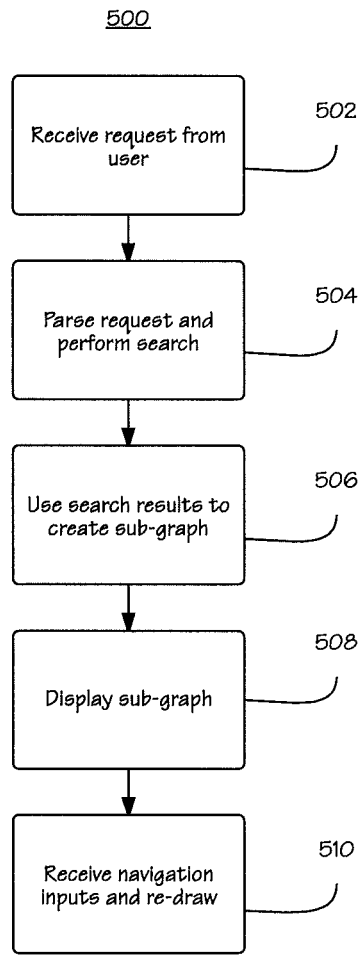
FIG. 5 is a flowchart illustrating the operation of an embodiment.

A flowchart illustrating a method 500 of visualizing a graph database is presented in FIG. 5. Method 500 is merely exemplary and is not limited to the embodiments presented herein. Method 500 can be employed in many different embodiments or examples not specifically depicted or described herein. In some embodiments, the procedures, the processes and/or the activities of method 500 can be performed in the order presented. In other embodiments, the procedures, the processes, and/or the activities of method 500 can be performed in any other suitable order. In still other embodiments, one or more of the procedures, the processes, and/or the activities of method 500 can be combined or skipped. In some embodiments, portions of method 500 can be implemented by computer system 100 (FIG. 1).

A searcher receives a request from a user (block 502). This request is a visualization request, using a variety of criteria. A more traditional search request of finding individual records might be handled in a different manner. The searcher parses the request and performs the search (block 504). The results (the nodes and the edges) that satisfy the search query formed into a sub-graph (block 506). The sub-graph is visually displayed via a user interface (block 508). The sub-graph can be displayed in one of a variety of different manners. In a typical manner, the nodes of a graph can be represented by a circle. The edges of a graph can be represented by a line joining two nodes. The user interface accepts navigation inputs from a user and re-draws the sub-graph as needed (block 510). As a graphical display, a variety of different inputs might be received. A user might want to zoom-in to concentrate on a smaller portion of the sub-graph. A user might wish to pan through the graph, possibly by using scroll bars or through a direct user input (such as on a touch-screen or via a mouse/touchpad). A user might want to zoom-out to see how the sub-graphs relate to other parts of the graph. A zoom-out might require the retrieval of additional information from other portions of the graph database in order to display those portions.

Figure 6:
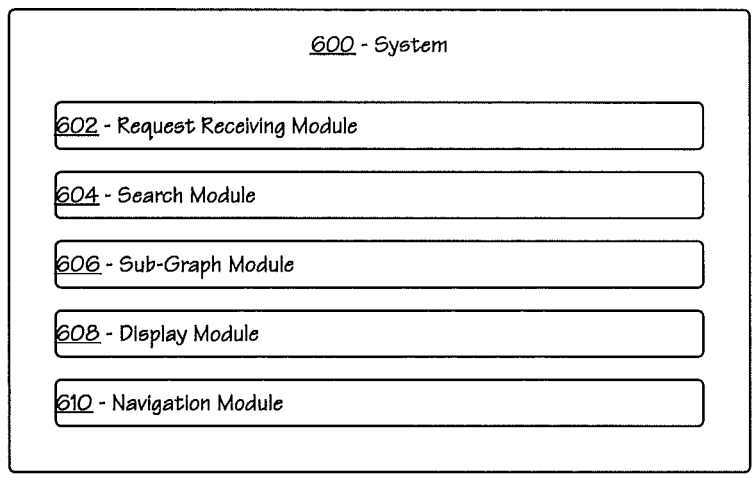
FIG. 6 is a block diagram illustrating a system capable of performing an embodiment.

Turning ahead in the figures, FIG. 6 illustrates a block diagram of a system 600 that is capable of performing disclosed embodiments. System 600 is merely exemplary and is not limited to the embodiments presented herein. System 600 can be employed in many different embodiments or examples not specifically depicted or described herein. In some embodiments, certain elements or modules of system 600 can perform various procedures, processes, and/or acts. In other embodiments, the procedures, processes, and/or acts can be performed by other suitable elements or modules.

In a number of embodiments, system 600 can include request receiving module 602. In certain embodiments, request receiving module 602 can perform block 502 (FIG. 5) of receiving a request.

In a number of embodiments, system 600 can include search module 604. In certain embodiments, search module 604 can perform block 504 (FIG. 5) of performing a search based on the received request.

In a number of embodiments, system 600 can include sub-graph module 606. In certain embodiments, sub-graph module 606 can perform block 506 (FIG. 5) of creating a sub-graph from the results of the search.

In a number of embodiments, system 600 can include display module 608. In certain embodiments, display module 608 can perform block 508 (FIG. 5) of displaying a sub-graph of the results of the search.

In a number of embodiments, system 600 can include navigation module 610. In certain embodiments, navigation module 610 can perform block 510 (FIG. 5) of navigating through the sub-graph based on a user's inputs.

Although the above embodiments have been described with reference to specific embodiments, it will be understood by those skilled in the art that various changes can be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 can be modified, and that the foregoing discussion of certain of these embodiments does not necessarily represent a complete description of all possible embodiments.

For example, one or more of the procedures, processes, or activities of FIGS. 1-7 can include different procedures, processes, and/or activities and be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that can cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   a construction module arranged to receive a text input and generate a first graph database using the text input, wherein the first graph database comprises a plurality of edges extending between a plurality of nodes, and wherein an edge of the plurality of edges extending between two or more nodes of the plurality of nodes represents a relationship between the two or more nodes;
   a processing module arranged to create an index from the first graph database, wherein the first graph database is stored on a first distributed storage system;
   a searching module arranged to receive queries from a user as an input to the system and retrieve results to be used to create an output of the system;
   a visualizer module arranged to:
     receive the results from the searching module;
     generate a sub-graph from the results, the sub-graph comprising a portion of the first graph database; and
     create a visual reproduction of the sub-graph for display to the user; and
   an index storage module arranged to store the index on a second distributed storage system.

2. The system of claim 1, wherein:
   each node and edge that have the relationship with each other are stored together as an artifact.

3. The system of claim 2, wherein:
   the index is created using a MapReduce algorithm on the artifacts.

4. The system of claim 1 further comprising a reading module arranged to receive the first graph database as an input and create a text file output by finding requested artifacts in a graph of interest.

5. The system of claim 1 further comprising a transformation module arranged to receive the first graph database as an input and generate a second graph database as an output.

6. The system of claim 1, wherein the visualizer module is further arranged to:
   receive navigation inputs; and
   re-draw the visual reproduction based on the navigation inputs.

7. The system of claim 1 further comprising:
   a reading module arranged to receive the first graph database as an input and create a text file output by finding requested artifacts in a graph of interest;

a transformation module arranged to receive the first graph database as an input and generate a second graph database as an output; and the visualizer module is further arranged to:
receive navigation inputs; and
re-draw the visual reproduction based on the navigation inputs.

8. The system of claim 1, wherein the text input comprises a relational database comprising a table.

9. A system comprising:
one or more processing modules; and
one or more non-transitory memory storage modules storing computing instructions configured to run on the one or more processing modules and perform acts of:
receiving a request;
searching a distributed graph database with a distributed index to generate a result, the distributed graph database comprising a plurality of edges extending between a plurality of nodes;
generating a first sub-graph from the result, the first sub-graph comprising a portion of the distributed graph database;
creating a visual reproduction of the first sub-graph; and
facilitating a display of the visual reproduction of the first sub-graph to a user.

10. The system of claim 9, wherein the computing instructions are further configured to perform acts of:
receiving first navigational inputs; and
re-drawing the visual reproduction of the first sub-graph based on the first navigational inputs.

11. The system of claim 10, wherein the first navigational inputs are selected from panning, zooming in, and zooming out.

12. The system of claim 10, wherein the computing instructions are further configured to perform acts of:
receiving second navigational inputs;
generating a second sub-graph based on the second navigational inputs, the second sub-graph comprising a new portion of the distributed graph database and a portion of the first sub-graph;
creating a visual reproduction of the second sub-graph; and
facilitating a display of the visual reproduction of the second sub-graph to the user.

13. The system of claim 9 further comprising:
a construction module arranged to:
receive a text input comprising a relational database, the relational database comprising a table; and
generate a first graph database using the text input;
an index creation module arranged to create an index from the first graph database, wherein the first graph database is stored on a first distributed storage system; and
an index storage module arranged to store the index on a second distributed storage system different than the first distributed storage system.

14. The system of claim 9 further comprising a reading module arranged to receive a first graph database as an input and create a text file output by finding requested artifacts in a graph of interest.

15. The system of claim 9 further comprising:
a transformation module arranged to receive a first graph database as an input and generate a second graph database as an output.

16. The system of claim 9 further comprising:
a construction module arranged to:
receive a text input comprising a relational database, the relational database comprising a table; and
generate a first graph database;
an index creation module arranged to create an index from the first graph database, wherein the first graph database is stored on a first distributed storage system;
an index storage module arranged to store the index on a second distributed storage system different than the first distributed storage system; and
a reading module arranged to receive the first graph database as an input and create a text file output by finding requested artifacts in a graph of interest, wherein:
the computing instructions are further configured to perform acts of:
receiving first navigational inputs;
re-drawing the visual reproduction of the first sub-graph based on the first navigational inputs;
facilitating a display of the visual reproduction of the first sub-graph to a user;
receiving second navigational inputs;
generating a second sub-graph based on the second navigational inputs, the second sub-graph comprising a new portion of the distributed graph database and a portion of the first sub-graph;
creating a visual reproduction of the second sub-graph;
facilitating a display of the visual reproduction of the second sub-graph to the user; and
the first navigational inputs and the second navigational inputs are selected from panning, zooming in, and zooming out.

17. The system of claim 9, wherein:
the portion of the distributed graph database comprises two or more nodes stored on separate database servers; and
generating the first sub-graph comprises receiving request results from each of the separate database servers.

18. A method comprising:
receiving a request from a user;
searching a distributed graph database with a distributed index to generate a result, wherein the distributed graph database comprising a plurality of edges extending between a plurality of nodes;
generating a first sub-graph from the result, the first sub-graph comprising a portion of the distributed graph database;
creating a visual reproduction of the first sub-graph; and
facilitating a display of the visual reproduction of the first sub-graph to the user.

19. The method of claim 18 further comprising:
receiving first navigational inputs; and
re-drawing the visual reproduction of the first sub-graph based on the first navigational inputs.

20. The method of claim 19, wherein:
the first navigational inputs are selected from panning, zooming in, and zooming out.

21. The method of claim 18 further comprising:
receiving second navigational inputs;
generating a second sub-graph based on the second navigational inputs, the second sub-graph comprising a new portion of the distributed graph database and a portion of the first sub-graph;
creating a visual reproduction of the second sub-graph; and facilitating a display of the visual reproduction of the second sub-graph to the user.

22. The method of claim 18 further comprising:

receiving first navigational inputs;

re-drawing the visual reproduction of the first sub-graph based on the first navigational inputs;

receiving second navigational inputs;

generating a second sub-graph based on the second navigational inputs, the second sub-graph comprising a new portion of the distributed graph database and a portion of the first sub-graph;

creating a visual reproduction of the second sub-graph; and facilitating a display of the visual reproduction of the second sub-graph to the user; wherein:
  the first navigational inputs and the second navigational inputs are selected from panning, zooming in, and zooming out.

23. The method of claim 18, wherein:

the portion of the distributed graph database comprises two or more nodes stored on separate database servers; and generating the first sub-graph comprises receiving request results from each of the separate database servers.

* * * * *